Figure 1:
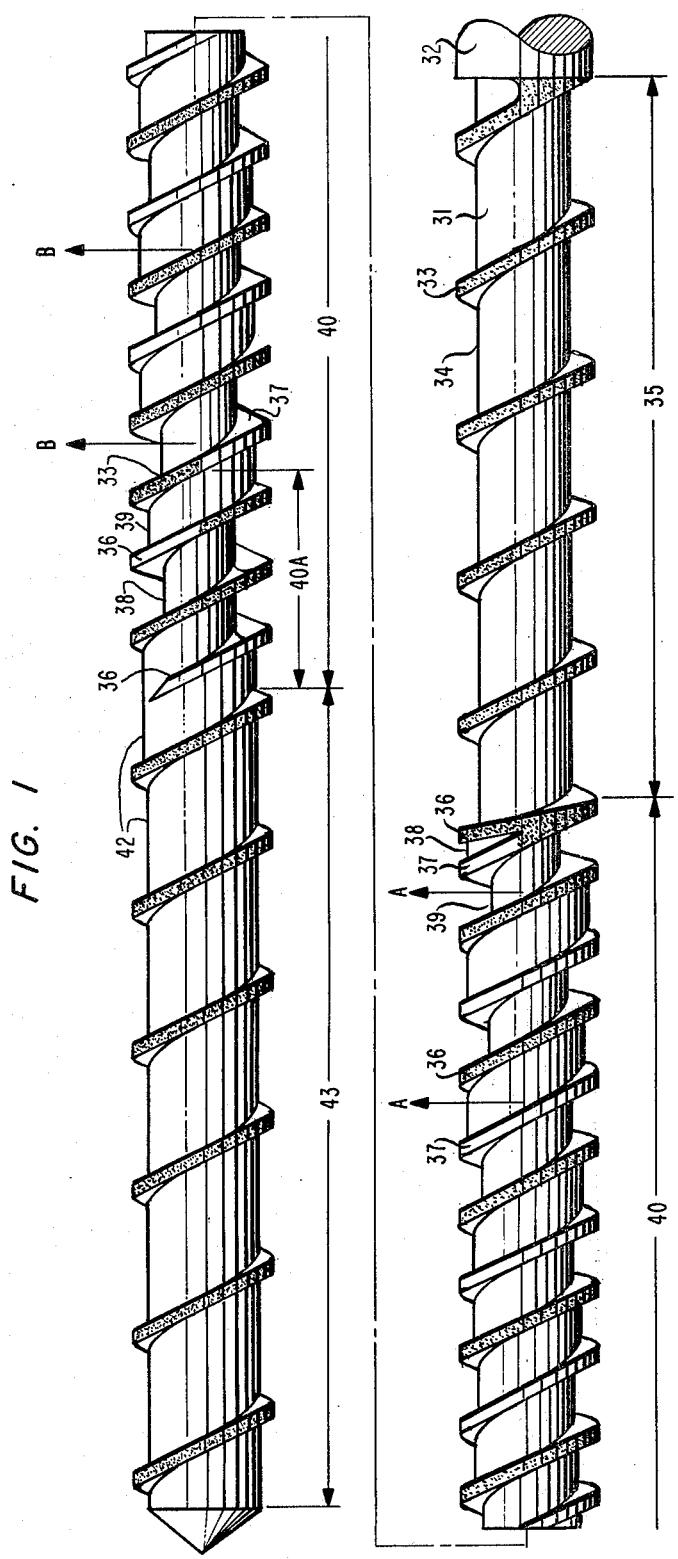

United States Patent [19]

Willert

[11] 4,330,214
[45] May 18, 1982

[54] PLASTICIZING SCREW

[75] Inventor: William H. Willert, N. Plainfield, N.J.

[73] Assignee: W. H. Willert, Inc., North Plainfield, N.J.

[21] Appl. No.: 122,414

[22] Filed: Feb. 19, 1980

[51] Int. Cl.³ .............................................. B29B 1/06
[52] U.S. Cl. ........................................ 366/78; 366/79
[58] Field of Search ...................... 366/79, 88, 89, 90, 366/323, 78; 425/208, 209

[56] References Cited

U.S. PATENT DOCUMENTS

| | | | |
|---|---|---|---|
| 3,701,512 | 10/1972 | Schippers et al. | 366/89 X |
| 3,858,856 | 1/1975 | Hsu | 366/88 |
| 3,989,941 | 11/1976 | Gasior et al. | 366/79 |
| 4,000,884 | 1/1977 | Chung | 366/88 |
| 4,128,341 | 12/1978 | Hsu | 425/208 X |
| 4,227,870 | 10/1980 | Kim | 425/208 |

Primary Examiner—Philip R. Coe

[57] ABSTRACT

A plasticizing screw which has a feed zone, a plasticizing zone, and a metering zone. In the feed zone the screw has a single flight which forms a feed channel and which feeds solid material to the plasticizing zone. At the beginning of the plasticizing zone, a secondary or barrier flight is introduced to divide the feed channel into a solids channel and a melt channel. The solids channel is cut deeper than the feed channel at the beginning of the plasticizing zone so as to be able to accommodate all of the solids contained in the feed channel even though its width is substantially less than the width of the feed channel. The depth of the solids channel gradually decreases as it approaches the end of the plasticizing zone.

The depth of melt channel is shallow at the beginning of the plasticizing zone and gradually deepens as it approaches the end of the plasticizing zone so as to accommodate all of the plasticized material.

8 Claims, 5 Drawing Figures

PLASTICIZING SCREW

This invention relates to a plasticizing screw. More particularly, the present invention relates to a plasticizing screw designed for use in a single screw extruder or a reciprocating screw plasticizer of the type commonly employed for processing plastic materials into finished plastic parts and compounds.

In the preparation of plastic materials utilizing a single screw extruder and a conventional single stage screw including feed, transition and metering sections, the raw or unmelted plastic is introduced in the feed section and is advanced to the end of the metering section by means of the helical flight caused by rotation of the screw. During the course of its flight, the plastic material is heated by means of heat conduction from the cylinder and shear between the metal surfaces of the rotating screw, the stationary extruder barrel and the plastic itself.

It has been found that some of the unplasticized material frequently becomes encapsulated in the hotter material or melt and travels through the extruder without being thoroughly melted or attaining uniformity of texture. This has been attributed to the large cross-sectional area encountered in the conventional extruder screw.

Accordingly, improvement in the quality and uniformity of the extrudate from an extruder has been a continuing source of focus by workers in this art. Efforts to obviate the foregoing limitations have resulted in devices such as flight interrupters, reverse flights, blisters, mixing pins, Dulmage torpedos and valved back pressure controls.

During the past decade, there has been a birth of interest in a class of devices commonly known as "barrier-type" devices. These devices typically comprise two parallel channels having disposed therebetween a barrier flight with a predetermined width and clearance over which all the plastic material must flow. These devices are an integral part of the screw and rotate with it. Exemplary devices of this type are equipped with channels that are parallel with the center line of the screw or have flutes which are on a helex angle. They are usually two diameters long with a plurality of inlet and outlet channels, the number being dependent upon the material employed and screw diameter.

Still another type of barrier screw known in the art includes two channels formed by adding an intermediate flight in the forward portion of the feed section of a conventional single stage screw and extending it through the beginning of the metering section. The cross-sectional area between the channel conveying the solid as unmelted plastic and which transfers the melt to the adjacent channel is adjusted by varying the pitch of the intermediate flight, the barrier flight, with sufficient clearance as determined by the plastic material employed to permit the melt either to pass over as in U.S. Pat. No. 3,375,549 or by having parallel flights with variable depth as in U.S. Pat. No. 3,698,541.

Although devices of this type have proven satisfactory, it has been apparent that the ultimate goal of attaining 100% melt uniformity has not been consistently attained. More specifically, that goal has been elusive from the standpoint of attaining dispersion and distribution of the ingredients in the plastic compound at a desired uniform temperature.

In accordance with the present invention, this end is effectively attained by means of a novel plasticizing screw. The described screw comprises a metal shaft adapted with a drive end and having a feed zone, a plasticizing or melting zone and a metering or discharge zone. In the feed zone, the screw is adapted with a primary thread having a leading and trailing edge conforming to a substantially uniform pitch which is maintained over the entire length of the screw. At the terminus of the feed section, the primary flight is converted to the barrier flight by selectively reducing its diameter which is continued thereat until being restored to its original diameter approximately one turn before reaching the end of the plasticizing section and continued at full diameter over the remainder of the screw. The screw is also provided with a secondary thread or flight, being at the diameter of the primary flight, interposed behind the primary flight at the beginning of the plasticizing or transition zone by being generated at a lesser pitch than the primary thread for one or more turns and until it is located in a predetermined position in the channel formed by the primary thread. Then, it continues forward at a uniform pitch parallel to the primary thread for the length of the plasticizing section, so forming a secondary or melt channel behind the primary thread. The diameter of the secondary thread is equivalent to the diameter of the primary thread in the feed zone and continues thereat until the last turn in the plasticizing section where it is reduced in diameter at the point the primary thread is returned to its original diameter.

In order to attain maximum efficiency, the depth of the feed or solids channel at the beginning of the plasticizing or melting section is substantially increased so that it can accommodate the solids or unmelted material being fed by the primary flight before the secondary flight was interposed into the feed channel, thereby reducing its width. Thereafter the depth of the solids channel in the plasticizing zone is progressively reduced until the last turn of the zone is reached, the depth of the secondary or melt channel being progressively increased so that plasticized feed material will flow from the feed or solids channel and be collected in the secondary or melt channel. The flow from this secondary channel is then returned to the channel which was originally the feed or solids channel at the end of the plasticizing zone.

Figure 2:
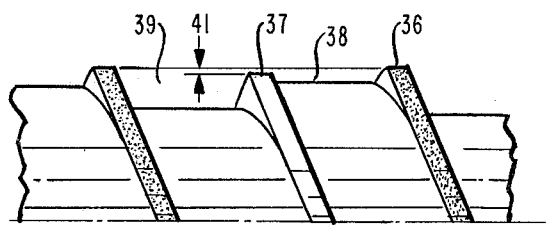
Figure 3:
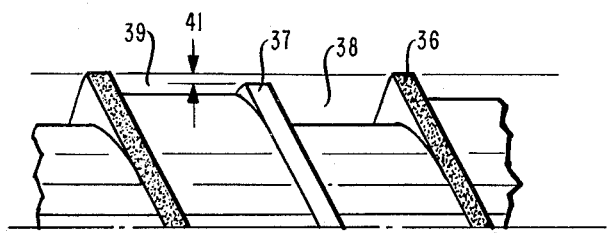
Figure 4:
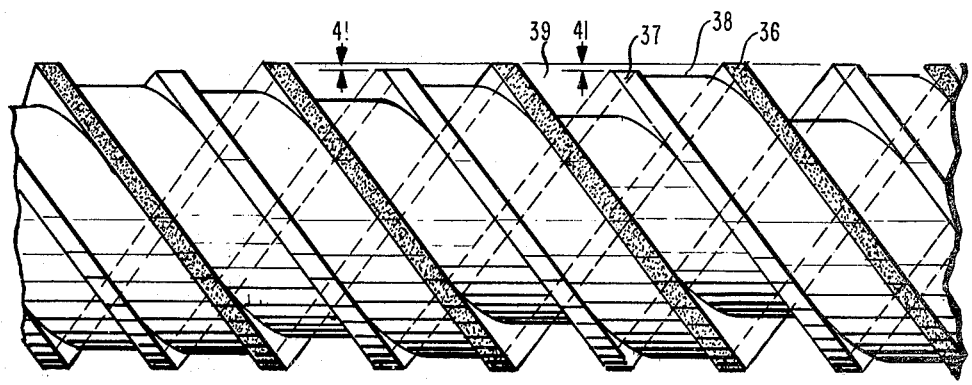
Figure 5:
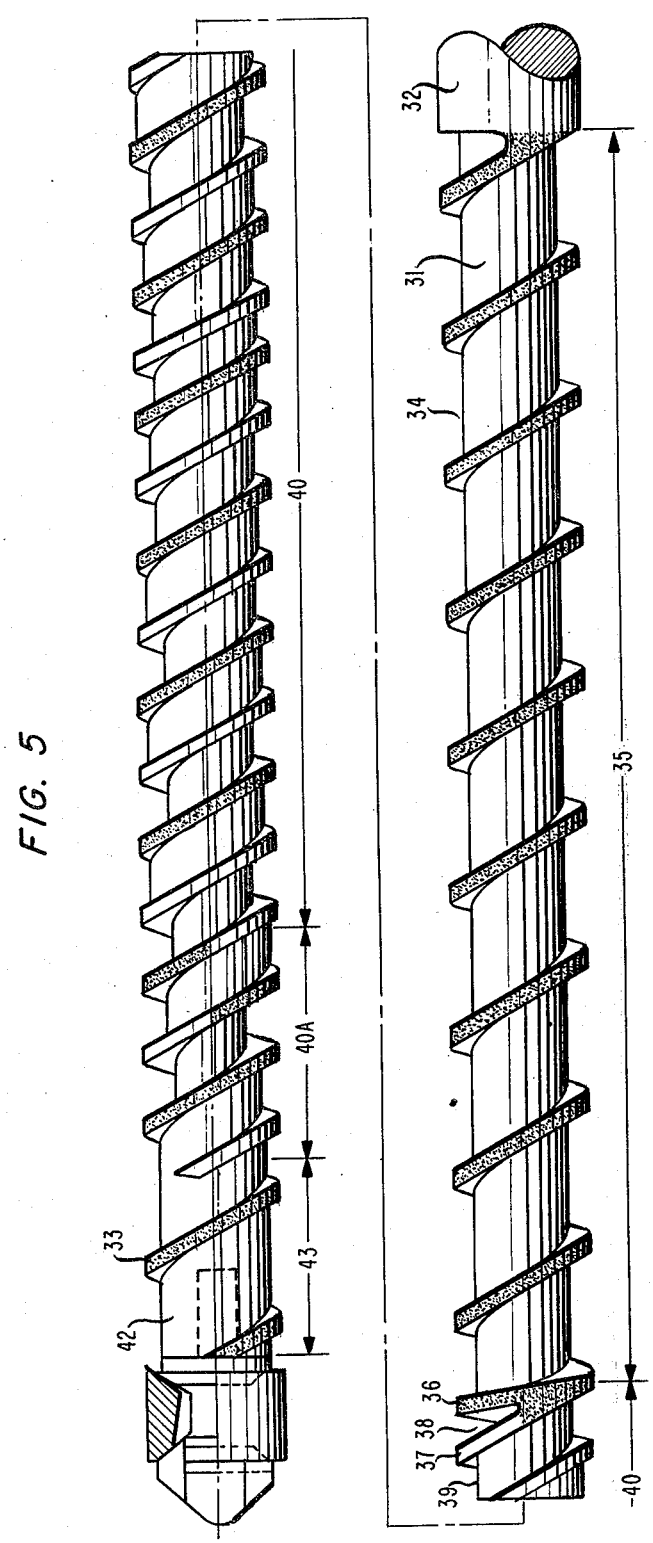

The invention will be more readily understood by reference to the following detailed description taken in conjunction with the accompanying drawing wherein:

FIG. 1 is a front elevational view of a plasticizing screw in accordance with the invention, FIG. 2 is a front elevational view of section AA of the screw of FIG. 1, FIG. 3 is a front elevational view of section BB of the screw of FIG. 1, FIG. 4 is a front elevational view of a section of the screw of FIG. 1 adapted for a double pitch flight with a barrier, and FIG. 5 is a front elevational view of a plasticizing screw in accordance with the present invention which is suitable for use in a reciprocating screw plasticizer for injection molding.

With reference now to FIG. 1, there is shown a typical screw of the invention. The screw includes body 31 having a drive hub 32, main or primary flight 33 which traverses the length of feed section 35. The primary flight in the feed section has a constant diameter and a pitch equal to the screw diameter, so forming a feed channel 34 of constant depth. Shown disposed at the end of feed section 35 is secondary flight 36 which is generated behind primary flight 33 by machining its helix angle at a lesser angle than that of flight 33 for approximately one turn or until the flight trails the pitch of the primary flight by about one third of the width of the total feed channel. At this point, the helix angle is changed to run parallel to flight 37 which is a barrier flight. Primary flight 33 becomes barrier flight 37 at the end of the feed section by reducing its height by a predetermined amount as shown by clearance 41 in FIG. 2. Melt channel 38 is formed by machining a groove between flight 36 and 37. At the end of feed section 35 the feed channel 34 is deepened to form a solids channel 39 which will accommodate the solids it receives from the feed channel even though it is made narrower by the introduction of flight 36.

Over the length of plasticizing or melting section 40, flights 36 and 37 are parallel. However, the depth of solids channel 39 becomes progressively shallower and the newly formed melt channel becomes deeper as shown in FIGS. 2 and 3 in sections AA and BB, respectively.

Near the end of plasticizing section 40, over an area of approximately two turns, a distribution section 40A is formed by barrier flight 37 reverting to its original diameter, the primary flight 33 once again, and concurrently reducing the diameter of the secondary flight 37 to form a barrier flight 36. At the same time, channel 38 is reduced in depth over this section and is terminated by blending it with solids channel 39 to form metering channel 42. Flight 33 with channel 42 then remains uniform in diameter and depth over the length of metering section 43. FIG. 4 illustrates the manner in which plasticizing section 40 may be used in a double pitch arrangement or for any multi-pitch design.

With reference now to FIG. 5, there is shown a plasticizing screw of the invention adapted for use in a reciprocating screw plasticizer. This design distinguishes from that of FIG. 1 in that the feed section 35 is longer to compensate for the reciprocating action of the screw whereas the metering section 43 is shorter in length since it is not required for metering because the melt accumulates ahead of the screw as the screw retreats in the rearward direction.

The use of the screw described herein results in improved performance in the process of extrusion as will be evident from the following discussion.

In the operation of the extrusion process utilizing the screw of FIG. 1, the plastic solids or raw material reaches feed section 35 of screw 31 and proceeds down channel 34 with screw rotation. When the feed reaches plasticizing section 40, the partially heated material enters channel 39 wherein it is compressed against the inside wall of the extrusion cylinder. As the plastic melts, it then passes through the opening or clearance 41 at the top of flight 37 and then proceeds into melt channel 38. In light of the fact that solids channel 39 continues to grow shallower, almost all of the material passes over barrier flight 37 as it melts and collects in secondary channel 38. Since the clearance between the top of the flight 37 and the inside diameter of the extrusion cylinder is designed to be small, only well plasticized material (melt) will collect in channel 38. Additionally, the shearing action on the plastic material as it goes over the flight will further refine it.

After most of the material collects in channel 38 near the end of plasticizing zone 40, it is then blended with material remaining in channel 39 by reversing the action converting flight 37 from a barrier flight to a primary flight 33 again with channels 38 and 39 both flowing into channel 42 at the beginning of the metering section.

The same advantages or even superior results are obtained when the screw of FIG. 5 is assembled in a conventional reciprocating screw plasticizer. The only distinguishing feature from a design standpoint over the screw arrangement of FIG. 1 is feed section 35 which is longer and a shorter metering section 43 to compensate for the reciprocating action of the screw, plasticizing section 40 remaining essentially the same. Since all material flows over the barrier flight 37 as the solids flow down channel 39 and becomes plasticized and collects in secondary channel 38, no back pressure is necessary to generate shear and achieve the desired end result.

It will be appreciated by those skilled in the art that the foregoing description is for purposes of exposition only and that variations to achieve the described structure may be made. It will also be understood by those skilled in the art that the plasticizing screw described herein may be manufactured more economically than comparable prior art screws of a similar design.

I claim:

1. An extruder screw for use in a plastic extruder including a feed hopper and a heated barrel, said screw comprising a feed section, a plasticizing section and a metering section and having (a) a primary flight with leading and trailing edges conforming to a substantially uniform pitch over the entire length of said screw, the primary flight forming a feed channel at the inlet end of said screw and having a diameter which is selectively reduced at the beginning of the plasticizing section to become the barrier flight and restored to its original diameter approximately one turn prior to reaching the end of the plasticizing section, and (b) a secondary flight formed behind said primary flight at the beginning of the plasticizing section, the secondary flight being generated at a lesser pitch than said primary flight for a predetermined number of turns and until it reaches a predetermined position in the channel of the primary flight and continuing beyond that point at a uniform pitch parallel to the primary flight for the length of the plasticizing section, thereby forming a secondary channel behind said primary flight, the diameter of said secondary flight being equal to that of the primary flight in the feed section and maintained thereat until nearly the last turn in the plasticizing section at which point it is reduced, the primary flight being also restored to its original diameter at that point, the secondary flight ending within one half of a turn of the end of the plasticizing section the depth of the feed channel in the plasticizing section being progressively reduced until it approaches the last turn thereof, the depth of the secondary channel being progressively increased so that plastic feed will flow as it is plasticized from the feed channel and be collected in said secondary channel, and at approximately the last turn in the plasticizing section the diameter of the secondary flight is reduced and becomes the barrier flight, the primary flight being restored to its original diameter and the secondary channel being decreased in depth concurrently with the increase in depth of the primary channel, thereby permitting flow of material from the secondary channel back into the primary channel and establishing a metering channel over the final length of the screw.

2. A plasticizing screw in accordance with claim 1 for use in a reciprocating screw extruder.

3. An extruder screw having a feeding section and a plasticizing section, comprising:
   (a) a first flight which extends through the feeding and plasticizing sections;
   (b) a second flight which extends through the plasticizing section;
   (c) a feeding channel defined by the leading and trailing edges of the first flight in the feeding section;
   (d) a solids channel extending through said plasticizing section, defined by the trailing edge of one of said flights which has a predetermined diameter and by the leading edge of the other of said flights which has a diameter which is less than the diameter of said one of said flights, said solids channel having an initial depth which is greater than the depth of the feed channel and said solids channel is in communication with said feed channel to receive solid material therefrom; and
   (e) a melt channel extending through said plasticizing section, defined by the leading edge of one of said flights which has a predetermined diameter and by the trailing edge of the other of said flights which has a diameter which is less than the diameter of said one of said flights, said melt channel having an initial depth which is not greater than the depth of the feed channel and said melt channel is adapted to receive plasticized material passing over said one of said flights from the solids channel.

4. An extruder screw as set forth in claim 3 wherein said first flight has a diameter in the plasticizing section which is less than its diameter in said feeding section.

5. An extruder screw as set forth in claim 3 wherein the depth of said solids channel gradually diminishes.

6. An extruder screw as set forth in claim 3 wherein the depth of said melt channel gradually increases.

7. An extruder screw as set forth in claim 3 wherein the second flight in the plasticizing section has a diameter which is substantially equal to the diameter of the first flight in the feeding section.

8. An extruder screw as set forth in claim 3 wherein the diameter of said one of said flights is reduced for at least one turn of the flight at the end of the plasticizing section and the diameter of said other of said flights is increased for at least one turn of the flight at the end of the plasticizing section.

* * * * *